(12) United States Patent
Au et al.

(10) Patent No.: US 8,630,890 B2
(45) Date of Patent: Jan. 14, 2014

(54) PRODUCT MIGRATION ANALYSIS USING DATA MINING BY APPLYING A TIME-SERIES MATHEMATICAL MODEL

(75) Inventors: Siu-Tong Au, Bedminster, NJ (US); Rong Duan, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 919 days.

(21) Appl. No.: 12/327,441

(22) Filed: Dec. 3, 2008

(65) Prior Publication Data
US 2010/0138277 A1  Jun. 3, 2010

(51) Int. Cl.
- G06Q 10/00  (2012.01)
- G06Q 30/00  (2012.01)
- G06Q 20/00  (2012.01)

(52) U.S. Cl.
USPC ....... 705/7.29; 705/7.31; 705/7.33; 705/7.36; 705/7.37; 705/7.38; 705/7.39; 705/14.46; 705/22; 705/26.2; 705/28; 707/E17.014; 707/E17.046; 707/E17.044

(58) Field of Classification Search
USPC ........... 705/7.29, 7.31, 7.33, 7.36, 7.37, 7.38, 705/7.39, 14.46, 22, 26.2, 28; 707/E17.014, 707/E17.046, E17.044
See application file for complete search history.

(56) References Cited

U.S. PATENT DOCUMENTS

| | | | |
|---|---|---|---|
| 6,151,608 A * | 11/2000 | Abrams | 707/679 |
| 6,334,215 B1 * | 12/2001 | Barker et al. | 717/167 |
| 7,117,163 B1 * | 10/2006 | Iyer et al. | 705/7.32 |
| 2002/0161778 A1 * | 10/2002 | Linstedt | 707/102 |
| 2003/0078787 A1 * | 4/2003 | Hoffman et al. | 705/1 |
| 2004/0133551 A1 * | 7/2004 | Linstedt | 707/1 |
| 2005/0003998 A1 * | 1/2005 | Bertilsson et al. | 514/1 |
| 2007/0156673 A1 * | 7/2007 | Maga et al. | 707/5 |
| 2008/0255895 A1 | 10/2008 | Rajamony et al. | |

OTHER PUBLICATIONS

Allenet et al, Opinion and behaviour of pharmacists towards the substitution of branded drugs by generic drugs, survey of 1000 French pharmacists, Pharm World 2003.*
Au et al, Irregularity analysis in time series data, Stevens Institute of Technology, Aug. 8, 2006.*
Bass et al, Diffusion of New Products, Empirical Generalizations and Managerial uses, Marketing Science, v14, n3, part 2of 2, 1995.*
Bass et al, A diffusion theory model of adoption and substitution for successive generations of high-technology products, Management Science, v 33 No. 9, 1987.*
Bass et al, New Product Diffusion models in marketing, a review and directions for research, Journal of Marketing, 54,1 ABI Inform Global, p. 1, Jan. 1990.*

(Continued)

*Primary Examiner* — Mark A Fleischer
*Assistant Examiner* — Octavian Rotaru
(74) *Attorney, Agent, or Firm* — Scott P. Zimmerman, PLLC

(57) ABSTRACT

A method and system for mining a database for product migration analysis includes querying product usage data for a legacy product and a new product from the database as time series data. The product usage data is representative for a large number of consumers of the legacy and new products. A mathematical model may be used to determine a relationship between the two time series data. Product migration values and other features related to product migration, such as a transition period of product usage, may be estimated, determined or predicted.

20 Claims, 4 Drawing Sheets

(56) References Cited

OTHER PUBLICATIONS

Engle and Gragner, Cointegration and error correction, representation, estimation and testing, Econometrica, v55, n2, p. 251-276, Mar. 1987.*

Granger CWJ, Some properties of time series data and their use in econometric model specification, Journal of Econometrics, 16 p. 121-130, 1981.*

Johnson and Bhatia, Technological substitution in mobile communications, The Journal of Business and Industrial Marketing v12, i6, p. 383, 1997.*

Kappert et al, Neural Networks and Business Modelling, IEEE 1060-3425, 1997.*

Meuter et al, Choosing among alternative service delivery modes, An investigation of consumer trial self service technologies, Journal of Marketing, v69, Apr. 2005.*

Rogers Everett M, New Product Adoption and Diffusion, Journal of Consumer Research, vol. 2, p. 190-201, 1976.*

Shaw James K, Wireless Communications and Technology Substitution, New Telecom Quaterly, 1070-3683963, 2Q96, pp. 37-43, 1996.*

Wright et al, New Product Diffusion in marketing, an assesment of two approches, Marketing Bulletin, 6, p. 32-41, Article 4, 1995.*

Bass et al., New Product Diffusion models in marketing, a review and directions for research, Journal of Marketing, 54,1 ABI Inform Global, p. 1, Jan. 1990.*

Bass et al, Evolution of Technological Generations The Law of Capture,Sloan Management Review, 33, 2, p. 66, ABINFORM, 1992.*

Bass et al., A diffusion theory model of adoption and substitution for successive generations of high-technology products, Management Science, v. 33 No. 9, 1987.*

* cited by examiner

PRODUCT MIGRATION ANALYSIS USING DATA MINING BY APPLYING A TIME-SERIES MATHEMATICAL MODEL

BACKGROUND

1. Field of the Disclosure

The present disclosure relates to product migration analysis and, specifically, to data mining for analyzing product migration.

2. Description of the Related Art

Product and service market data may be recorded in customer database systems. As the lifetime of a legacy product expires or nears expiration, customers may migrate from the legacy product to a newer version or release of the same or similar product.

DESCRIPTION OF EXEMPLARY EMBODIMENTS

Figure 1:
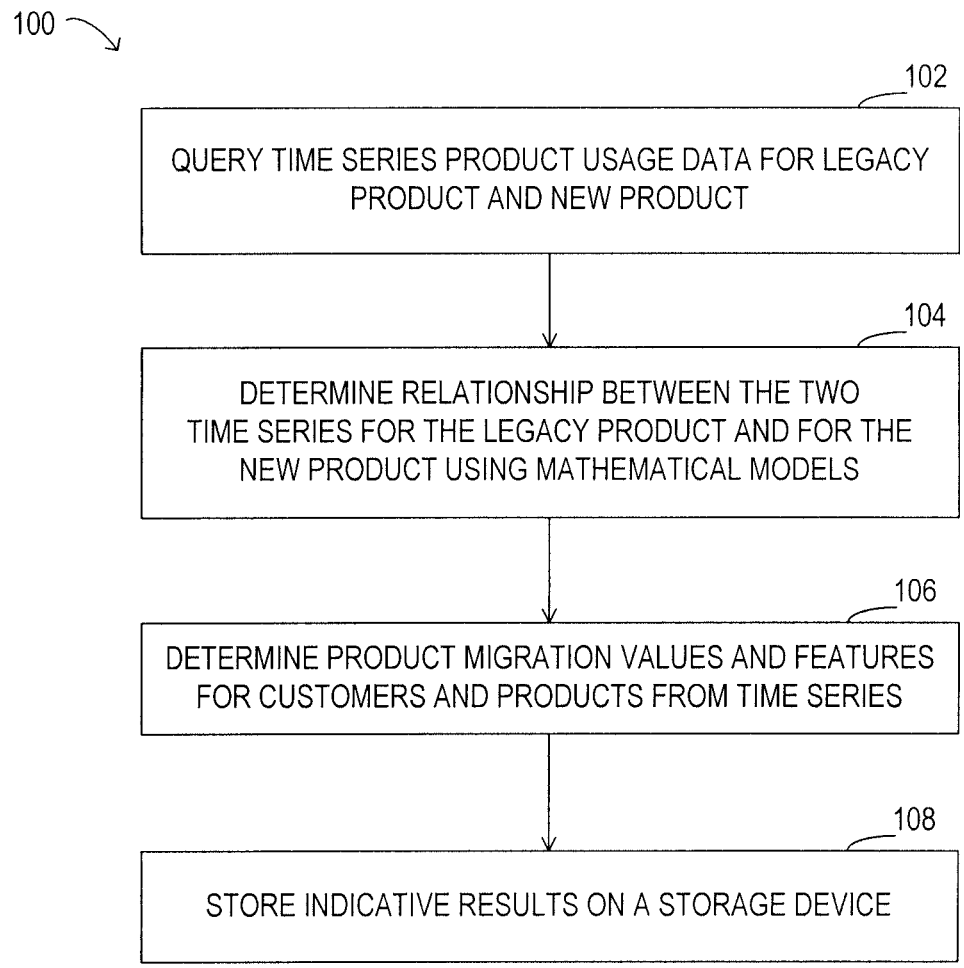
FIG. 1 is a block diagram of selected elements of an embodiment of a product migration analysis process.

Providers of products and services may record large volumes of market data in customer database systems. As referred to herein, a "product" encompasses products as well as services, which may be provided individually, repeatedly, or on a continuing basis (i.e., subscriptions, service contracts, service agreements, etc.). Product data for a plurality of customers is referred to herein as "product usage data." A "legacy product" refers herein to a product that is already established in the marketplace, while a "new product" denotes a product that is being introduced to the marketplace, or is relatively new to the marketplace. A new product may serve as a replacement, update, or upgrade for a legacy product; for example, a newly released version of the legacy product.

The usage behavior of customers of the legacy product may include continuing usage, termination, or migration, as examples. As the lifetime of a legacy product expires, customers may migrate from the legacy product to a newer product version or release. Modeling market behavior with respect to migration may be an important consideration in planning the release of a new product. As will be discussed in detail below, commercially relevant features of product migration may be discovered by mining a customer database of product usage data, and applying mathematical models to reveal a relationship between legacy product usage and new product usage.

In one aspect, a disclosed method for mining a database for product migration analysis includes applying a mathematical model to product usage data extracted from the database to reveal an association between product usage data for a legacy product and for a new product. Information indicative of the association may be stored on a storage device. Availability of the legacy product and availability of the new product may overlap in time. The product usage data may be a time series of usage values for a plurality of customers. The time series for the legacy product and the time series for the new product may be additive and may be time-invariant. In some cases, applying the mathematical model may reveal a relationship between a decline in usage values for the legacy product and an increase in usage values for the new product, and may further reveal a fraction of the decline that results from the increase.

The mathematical model may be applied to identify which of the plurality of customers are migrating from the legacy product to the new product, and may further include a generalized likelihood ratio test (GLRT) to identify change points in the time series for the legacy product and the time series for the new product. In some examples, it may be determined that the time series for the legacy product and the time series for the new product are co-integrated, such that an arbitrary relationship between the two time series is substantially ruled out. The usage values may include revenue values and may include consumption values for both the legacy product and the new product.

In some embodiments, the usage values may include customer contact values for both the legacy product and the new product, whereby the customer contact values represent interaction events between a customer and a provider of the legacy and new products. The customer contact values may represent at least one of telephone interaction, website interaction, textual interaction, and personal interaction. In some cases, the customer contact values may represent at least one of purchase inquiries, purchase orders, payment events, cancellation requests, billing inquiries, customer support events, product notifications, survey results, and visitations.

In another aspect, a disclosed computer system for processing product usage data in a database includes a processor and memory media accessible to the processor, including processor executable instructions. The instructions may be executable to query product usage data from the database for both a legacy product and a new product, and apply a mathematical model to the product usage data to reveal a numerical relationship between the legacy product and the new product. The new product may represent a replacement of the legacy product, while the product usage data may include a time series of usage values for a plurality of consumers.

In some examples, the numerical relationship may include a causal relationship between a decline in usage values for the legacy product and an increase in usage values for the new product. The numerical relationship may estimate which of the plurality of consumers are migrating from the legacy product to the new product. The usage values may include revenue and/or consumption values for both the legacy product and the new product. The numerical relationship may identify a transition period between predominance of the legacy product and predominance of the new product.

In some embodiments, the computer system may further include processor instructions executable to project a revenue value after the transition period for both the legacy product and the new product based on the numerical relationship.

In a further aspect, a disclosed computer-readable memory medium includes processor executable instructions for analyzing new product usage data and legacy product usage data. The instructions may be executable to query the new product usage data and the legacy product usage data, wherein the new and legacy product usage data is a time series of usage values for a plurality of consumers, and determine a functional relationship between the new product usage data and the legacy product usage data.

In some embodiments, the instructions executable to determine the functional relationship may include instructions executable to apply a mathematical model to the product usage data to generate the functional relationship. The functional relationship may be expressed as at least one of a polynomial function, an additive function, a time invariant function, a co-integrated function, and a non-arbitrary function. The functional relationship may determine a transition period between predominance of the legacy product and predominance of the new product. In some cases, the instructions may further be executable to determine which of the plurality of consumers migrate from the legacy product to the new product. The instructions may still further be executable to determine revenue values for the legacy product and the new product before, during, and after the transition period.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of an embodiment of a product migration analysis process 100 is illustrated. Product usage data in the form of a time series may be queried for a legacy product and a new product (operation 102). Such usage data may be queried for one or more new products associated with the legacy product. A time series of values represents a historical recording of the values over a time period, and may include values having regular or irregular time intervals. Product usage data, such as the two time series queried in operation 102, may include values associated with a product, such as, but not limited to, revenue values, consumption values, or values related to customer contact.

The customer contact values stored in the database may represent interaction events between the customer and a provider of the legacy product and the new product(s). As used herein, "interaction" refers to a transfer or exchange of information, such as a communication between the customer and the provider. The customer contact values may represent different means for interaction between the customer and the provider, such as at least one of: telephone interaction, website interaction, textual interaction, video interaction, audio interaction, personal interaction, or a combination thereof. The customer contact values may also represent different types of communication, such as at least one of: purchase inquiries, purchase orders, payment events, cancellation requests, billing inquiries, customer support events, product notifications, survey results, visitations, or a combination thereof.

The values for the legacy product and for the new product may overlap in time, which may indicate that the legacy product and the new product have been concurrently available. The queried product usage data may further be restricted to particular markets, regions, language areas, regulatory districts, or other geographic criteria. In some embodiments, a desired market segment is selected based on customer attributes, such as but not limited to age, occupation, income, gender, etc., when issuing the query for product usage data in operation 102.

In operation 102, two time series, one for the legacy product and one for the new product, may exhibit certain mathematical properties. For example, the time series for the legacy product and the new product may be additive functions that preserve the addition operation. The two time series may be time-invariant, such that they do not explicitly depend on time.

A relationship between the two time series is determined using mathematical models (operation 104). The relationship may be a numerical relationship, for example, a statistical approximation. The relationship may be a functional relationship, such as a continuous function modeling a dependency between the two time series. In some cases, the functional relationship may be represented by a polynomial function. The relationship may be a causal relationship between a decline in product usage values for the legacy product and an increase in product usage values for the new product.

In some embodiments, the mathematical model involves a GLRT, which compares the changes in time series data for the legacy product and the new product. The GLRT is based on the Neyman-Pearson test for deciding between two hypotheses to detect a change when both models and change points are unknown. The GLRT assumes that the time series can be described by parametric family of probability distribution functions. Assuming a change point is occurs within a region, i.e., time interval, of the data, a generalized likelihood ratio may be formulated. To determine the most likely change point, a decision function of the maximum of the likelihood ratio is compared against a preset threshold at successive time steps. The change point may be estimated from the time step corresponding to the maximum of the decision function.

Accordingly, the GLRT represents a statistically efficient method to identify change points in the time series for the legacy product and in the time series for the new product. The change points may be used to determine a transition period between the predominance of the legacy product and the predominance of the new product. In some cases, a dependency or correlation for at least portions of the two time series may be determined in operation 104.

In some embodiments, the mathematical model in operation 104 involves establishing that the time series for the legacy product and the time series for the new product are co-integrated, i.e., that an arbitrary relationship between the two time series may be ruled out. A time series $x_t$ may be defined as I(d) if after differentiating d times, the time series is stationary, where d is an integer. A stationary time series may be represented as I(0). When relating two time series $x_t$ and $y_t$, such as the time series for the legacy product and the new product (or the respective customers purchasing the products), a simple form may be through a linear regression model, $$y_t = \beta x_t + \epsilon_t \quad \text{(Equation (1))}$$

where $y_t$ is the dependent variable, $x_t$ is the single exogenous predictor, and et is a zero mean white noise. Although the linear regression model in Equation (1) may be practical, from the Granger Representation Theorem, it may have multiple solutions of β if $x_t$ and $y_t$ are not stationary. For example, many macroeconomic and business variables are regarded as I(1), such that the relationship between $x_t$ and $y_t$ could be arbitrary. Thus, any estimated equations using these time series may not represent an economic or business meaning without careful treatment. When $\epsilon_t$ is I(0), β may be uniquely determined and used to interpret business relationships, such as causal or related relationships. In this case, variables $x_t$ and $y_t$ are designated as co-integrated. More generally, if a linear combination of a set of I(1) variables is I(0), then the variables may be designated as co-integrated. The co-integration concept may be relevant in the analysis of nonstationary economic time series. A generalization to I(d) variables is also possible, in which case the linear combination of co-integrated variables reduces to $I(d-d_0)$, where $d_0 > 0$.

A number of different co-integration tests may be employed to determine if et is stationary. The tests include the Augmented Dickey-Fuller (ADF) test, the Engle-Granger test, and Johansen's Maximum Likelihood procedure.

The ADF test may be used to determine if a variable is stationary. To overcome the problem of autocorrelation in the basic Dickey-Fuller (DF) test for a stationary variable, the DF test can be augmented by adding various lagged dependent variables. The correct value for number of lags can be determined by reference to a commonly produced information criteria such as the Akaike Information Criteria (AIC) or Schwarz-Bayesian Information Criteria (BIC). Compared to the DF test, the ADF test can also include a drift (constant) and time trend.

The Engle-Granger test may test the co-integration relationship between two or more non-stationary time series, by simply running an ordinary least square (OLS) estimation, obtaining the residuals, and then running the ADF test on the residuals to determine if the residuals are stationary. The time series may be designated as co-integrated if the residuals themselves are found to be stationary.

Johansen's Maximum Likelihood procedure may be applied to test co-integration relationships of a random vector, whereby a Vector Autoregressive (VAR) model can be applied. The VAR model may assume that all variables in the model are endogenous, although it is possible to include other exogenous variables as well. As proposed by Johansen, a maximum likelihood (ML) procedure may test if long-run coefficients and error correction VAR models can be produced. The ML procedure may involve further interpretation, especially when more than one single co-integrating relationship is present. When this occurs, then the most appropriate co-integrating vector may further be selected.

The co-integration test permits assessment of stable relationships in the migration analysis. It may be expected that migrating customers exhibit a more stable relationship between their respective time series values for the legacy and new products than new or lost (e.g., disconnected) customers. Migration customers may further show different characteristics of a co-integration coefficient than other types of customers.

Product migration values and features for customers and products may then be determined from the two time series (operation 106). For example, declines in the legacy product and growth in the new product may be determined in operation 106. The relationship between the declines of the legacy product and the growth of the new product may be determined. The portion of the declines that are due to migration or losses may be determined. The identity of migrating customers may be established. The revenue prior to, during and after the transition period may be determined.

In some cases, a migration model may be used to estimate revenue during and/or after a transition period for both the legacy and new products. Customers, or customer groups, of a legacy product who are likely at risk of being lost (i.e., by discontinuing the legacy product without purchasing the new product) may be identified. Customers, or customer groups, for whom a migration is recommended may further be identified. The fraction of the customer base of the legacy product that has migrated (i.e., already discontinued the legacy product and purchased the new product) may also be determined. A level of stabilization for values related to the legacy product and the new product may also be determined in operation 106. The level of stabilization may indicate the residual market volume for the legacy product after the new product becomes available. The level of stabilization may further indicate the market volume, or potential volume, for the new product after the transition period.

Results indicative of the relationship between the two time series, or indicative of product migration features, such as those described above, may then be stored on a storage device (operation 108). In some embodiments, results of process 100 are stored in a database in operation 108. The results of process 100 may include additional features, such as an indication of the transition period, estimated values for revenue and market volume, characterization of the migration, and identification of specific participants before, during, and after the migration.

Figure 2:
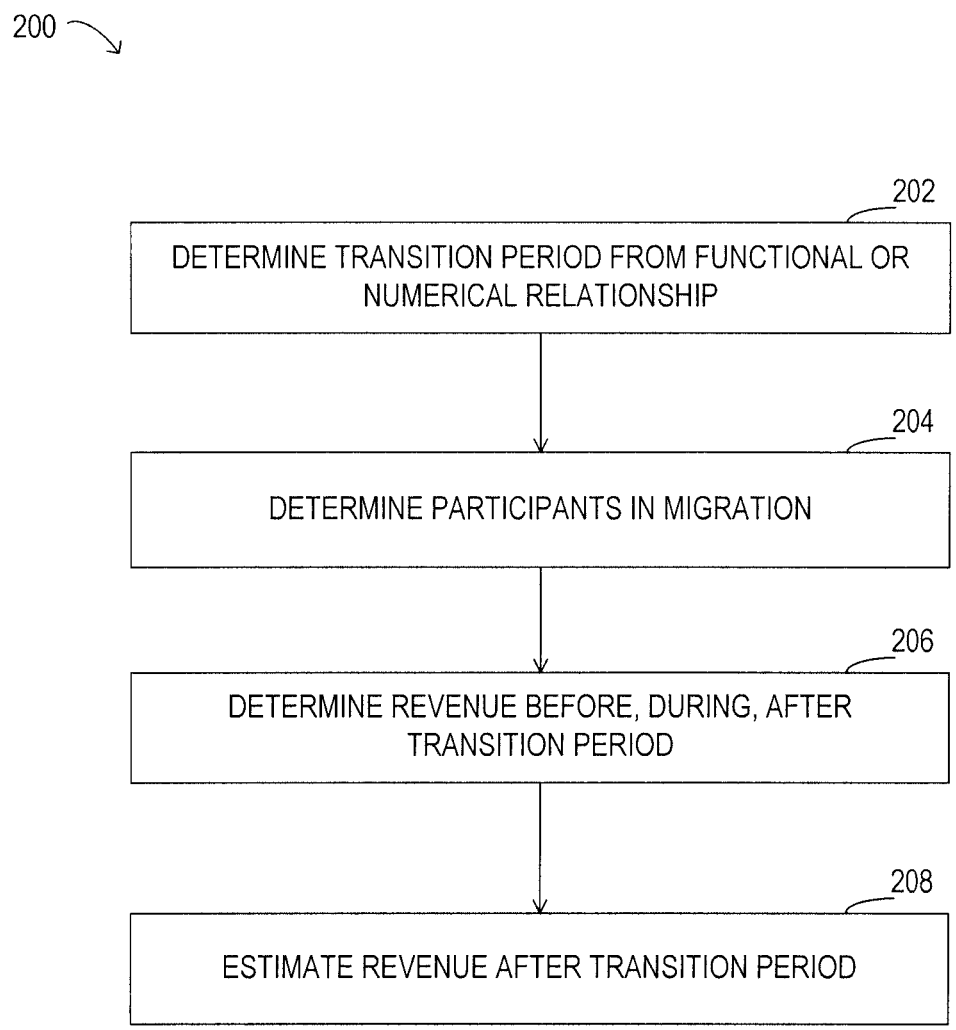
FIG. 2 is a block diagram of selected elements of an embodiment of a product migration analysis process.

Referring now to FIG. 2, a block diagram of selected elements of an embodiment of a product migration analysis process 200 is illustrated. In some embodiments, process 200 is representative of operation 106 in process 100 (see FIG. 1).

A transition period may be determined from the functional or numerical relationship (operation 202). As described above with respect to FIG. 1, a functional or numerical relationship between the two time series may be determined. The transition period may represent the time period during which a substantial amount of product migration activity occurs. The participants in the migration may be determined (operation 204). In some cases, operation 204 involves determining which customers for the new product represent migrations versus new customers, and may also involve determining which customers for the legacy product represent migrations versus lost customers. The revenue before, during and after the transition period may be determined (operation 206). In some cases, the revenue may be broken down into new customers, lost customers, and migrating customers. The revenue after the transition period may be estimated (operation 208). In some embodiments, the relationship between the two time series is extrapolated in operation 208 to project future revenue. Future revenue may be estimated for a number of different scenarios, for example, using different product usage values, or different models for the relationship between the two time series.

Figure 3:
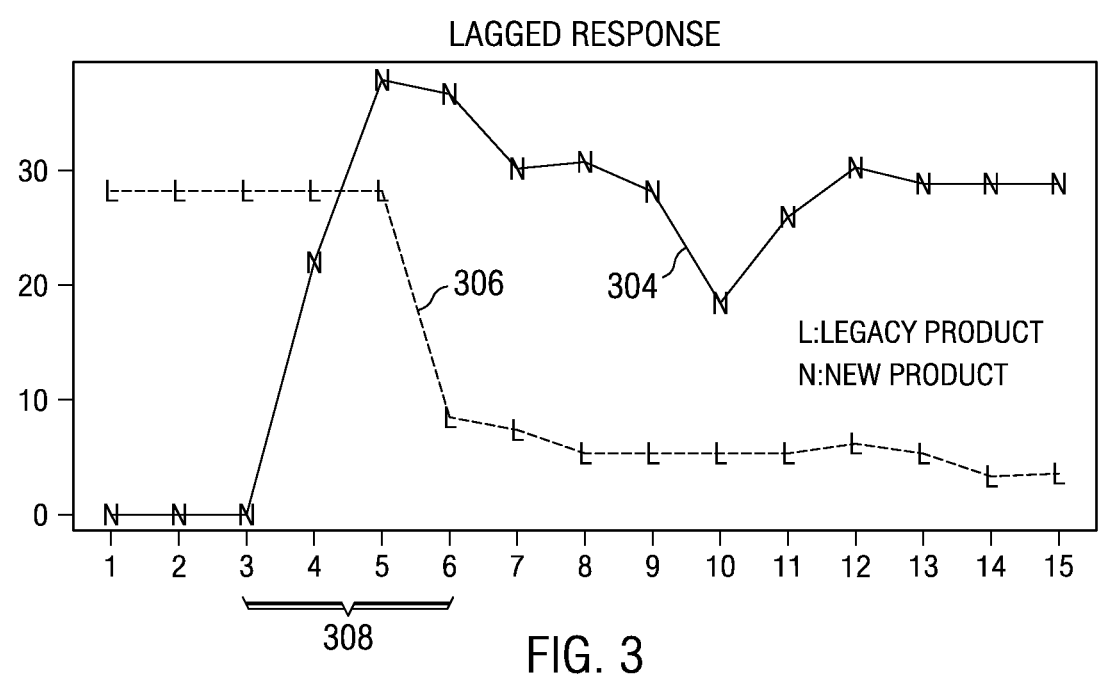
FIG. 3 is a plot of migration data for an embodiment of a product migration.

Turning now to FIG. 3, a plot of migration data for an embodiment of a product migration is illustrated. The data plot includes time series 304 for a new product, and time series 306 for a legacy product. The X-axis represents integer time increments, while the Y-axis represents a normalized amount of product activity, i.e., values indicative of product usage. As shown in FIG. 3, time period 308 may represent a transition period. Prior to transition period 308, the legacy product predominates, while the new product has not yet been introduced. After transition period 308, the new product dominates, although the legacy product still exhibits positive values. Also evident in FIG. 3 is a lagged response, indicated by the delayed reduction in the legacy product in response to the sudden increase in the new product. Thus, as shown in FIG. 3, the lagged response is an example of the relationship between the two time series 304 and 306.

Figure 4:
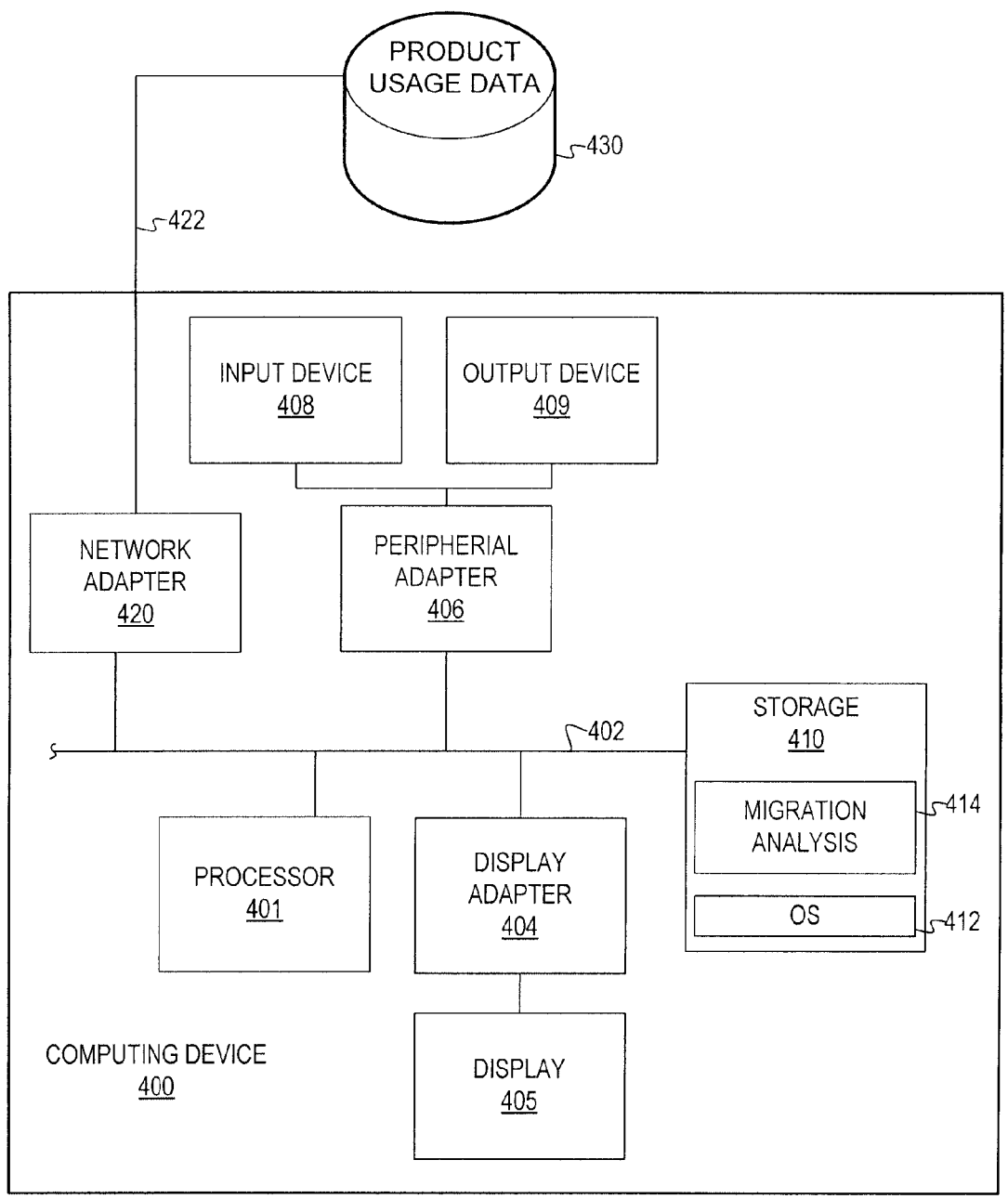
FIG. 4 is a block diagram of selected elements of an embodiment of a computing device.

Referring now to FIG. 4, a block diagram illustrating selected elements of an embodiment of a computing device 400 is presented. In the embodiment depicted in FIG. 4, device 400 includes processor 401 coupled via shared bus 402 to storage media, or memory media, collectively identified as storage 410.

Device 400, as depicted in FIG. 4, further includes network adapter 420 that interfaces device 400 to network 422. In embodiments suitable for use in database mining, device 400, as depicted in FIG. 4, may access database 430, which may store product usage data, via network 422. Device 400 may further include peripheral adapter 406, which provides connectivity for the use of input device 408 and output device 409. Input device 408 represents user input devices, such as a keyboard, mouse, trackball, touch panel, microphone, video camera, etc. Output device 409 represents input or output devices for sound, video, or images, such as speakers, microphones, headphones, projector displays, etc.

Device 400 is shown in FIG. 4 including display adapter 404 and further includes a display device or, more simply, a display 405. Display adapter 404 may interface shared bus 402, or another bus, with an output port for one or more displays, such as display 405. Display 405 may be implemented as a liquid crystal display screen, a computer monitor, a television or the like. Display 405 may comply with a display standard for the corresponding type of display. Standards for computer monitors include analog standards such as VGA, XGA, etc., or digital standards such as DVI, HDMI, among others. A television display may comply with standards such as NTSC (National Television System Committee), PAL (Phase Alternating Line), or another suitable standard. Display 405 may include an output device 409, such as one or more integrated speakers to play audio content, or may include an input device 408, such as a microphone or video camera.

Storage 410 encompasses persistent and volatile media, fixed and removable media, and magnetic and semiconductor media. Storage 410 is operable to store instructions, data, or both. Storage 410 as shown includes sets or sequences of instructions, namely, an operating system 412, and migration analysis application 414. Operating system 412 may be a UNIX or UNIX-like operating system, a Windows® family operating system, or another suitable operating system.

In some embodiments, storage 410 is configured to store and provide executable instructions for mining a database for product migration analysis, as mentioned previously. As shown in FIG. 4, device 400 is configured to execute instructions for mining a database for product migration analysis using migration analysis application 414, analogous to process 100 shown in FIG. 1. In some embodiments, migration analysis application 414 is further configured to execute process 200 shown in FIG. 2.

In operation, device 400 depicted in FIG. 4 may be used for mining a database for product migration analysis. For example, migration analysis application 414 may query time series and product usage data from database 430 for a legacy product and a new product. Migration analysis application 414 may then determine a relationship between the two time series using mathematical models, as discussed above. Migration analysis application 414 may further determine product migration values and features, for customers and products, from the time series. The product migration values may include a transition period from predominance of the legacy product to predominance of the new product. Thus, migration analysis application 414 may determine a transition period from a functional or numerical relationship between the two time series.

Migration analysis application 414 may further determine, estimate, or identify participants in a product migration. Revenue, or other sales values, may be determined by migration analysis application 414 before, during, and/or after the transition period. Migration analysis application 414 may then store indicative results of the analysis on a storage device, such as database 430.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for mining a database for product migration analysis, the method comprising:
   querying customers' product usage data stored in memory, the customers' product usage data in the form of a first time series for a legacy product;
   querying the customers' product usage data in the form of a second time series for a product replacement of the legacy product;
   applying, by a processor, a Neyman-Pearson based generalized likelihood ratio test that compares first changes in the first time series and second changes in the second time series to determine a transition period between a first predominance of the legacy product and a second predominance of the product replacement of the legacy product and to determine a correlation for at least portions of the first time series and the second time series;
   testing the first time series and the second time series for co-integration to assess a stable relationship; and
   using the applying of the Neyman-Pearson based generalized likelihood ratio test and the testing of the first time series and the second time series for the co-integration for successively
      determining a decline in the legacy product and a growth in the product replacement of the legacy product prior to, during, and after the transition period and
      determining a first plurality of customers of the legacy product who are at risk of being lost, a second plurality of the customers of the legacy product that have already migrated to the product replacement of the legacy product, and a third plurality of the customers of the legacy product for whom a migration to the product replacement of the legacy product is recommended.

2. The method of claim 1, further comprising determining an overlap in time between availability of the legacy product and the availability of the product replacement of the legacy product.

3. The method of claim 1, further comprising restricting the customers' product usage data.

4. The method of claim 3, further comprising adding the first time series for the legacy product and the second time series for the product replacement of the legacy product.

5. The method of claim 4, further comprising determining the first time series for the legacy product and the second time series for the product replacement of the legacy product are time-invariant.

6. The method of claim 1, further comprising determining a fraction of the decline in the legacy product that results from the growth in the product replacement of the legacy product.

7. The method of claim 1, wherein applying the Neyman-Pearson based generalized likelihood ratio test further comprises identifying change points in the first time series for the legacy product and in the second time series for the product replacement of the legacy product.

8. The method of claim 1, wherein testing the first time series and the second time series for co-integration to assess the stable relationship further comprises using one of an Augmented Dickey-Fuller test, an Engle-Granger, and a Johansen's Maximum Likelihood procedure.

9. The method of claim 1, wherein the customers' product usage data comprises one of customer contact values, revenue values, and consumption values for both the legacy product and the product replacement of the legacy product.

10. A computer system for processing product usage data in a database, the system comprising:
    a processor; and
    memory storing code that when executed causes the processor to perform operations, the operations comprising:
       querying customers' product usage data in the form of a first time series for a legacy product;
       querying the customers' product usage data in the form of a second time series for a product replacement of the legacy product;
       applying a Neyman-Pearson based generalized likelihood ratio test that compares first changes in the first time series and second changes in the second time series to determine a transition period between a first predominance of the legacy product and a second predominance of the product replacement of the legacy product and to determine a correlation for at least portions of the first time series and the second time series;

testing the first time series and the second time series for co-integration to assess a stable relationship; and using the applying of the Neyman-Pearson based generalized likelihood ratio test and the testing of the first time series and the second time series for the co-integration, for successively determining a decline in the legacy product and a growth in the product replacement of the legacy product prior to, during, and after the transition period and determining a first plurality of customers of the legacy product who are at risk of being lost, a second plurality of the customers of the legacy product that have already migrated to the product replacement of the legacy product, and a third plurality of the customers of the legacy product for whom a migration to the product replacement of the legacy product is recommended.

11. The system of claim 10, wherein the operations further comprise determining an overlap in time between availability of the legacy product and the availability of the product replacement of the legacy product.

12. The system of claim 10, wherein the operations further comprise restricting the customers' product usage data.

13. The system of claim 10, wherein the operations further comprise determining the first time series for the legacy product and the second time series for the product replacement of the legacy product are additive.

14. The system of claim 13, wherein the operations further comprise determining a fraction of the decline in the legacy product that results from the growth in the product replacement of the legacy product.

15. The system of claim 10, wherein the operations further comprise determining consumption values for both the legacy product and the product replacement for the legacy product.

16. A non-transitory memory storing instructions that when executed cause a processor to perform operations, the operations comprising:

querying customers' product usage data in the form of a first time series for a legacy product;

querying the customers' product usage data in the form of a second time series for a product replacement of the legacy product;

applying a Neyman-Pearson based generalized likelihood ratio test that compares first changes in the first time series and second changes in the second time series to determine a transition period between a first predominance of the legacy product and a second predominance of the product replacement of the legacy product and to determine a correlation for at least portions of the first time series and the second time series;

testing the first time series and the second time series for co-integration to assess a stable relationship, and using the applying of the Neyman-Pearson based generalized likelihood ratio test and the testing of the first time series and the second time series for the co-integration, for successively determining a decline in the legacy product and a growth in the product replacement of the legacy product prior to, during, and after the transition period and determining a first plurality of customers of the legacy product who are at risk of being lost, a second plurality of the customers of the legacy product that have already migrated to the product replacement of the legacy product, and a third plurality of the customers of the legacy product for whom a migration to the product replacement of the legacy product is recommended.

17. The memory of claim 16, wherein the operations further comprise determining an overlap in time between availability of the legacy product and the availability of the product replacement of the legacy product.

18. The memory of claim 16, wherein the operations further comprise restricting the customers' product usage data.

19. The memory of claim 16, wherein the operations further comprise determining the first time series for the legacy product and the second time series for the product replacement of the legacy product are additive.

20. The memory of claim 16, wherein the operations further comprise determining a fraction of the decline in the legacy product that results from the growth in the product replacement of the legacy product.

\* \* \* \* \*